(12) United States Patent
Szymocha

(10) Patent No.: US 7,077,124 B2
(45) Date of Patent: Jul. 18, 2006

(54) WALL INTEGRATED THERMAL SOLAR COLLECTOR WITH HEAT STORAGE CAPACITY

(76) Inventor: Kazimierz Szymocha, 11420-44 A Avenue, Edmonton (CA) T6J OZ9

( * ) Notice: Subject to any disclaimer, the term of this patent is extended or adjusted under 35 U.S.C. 154(b) by 0 days.

(21) Appl. No.: 10/896,178

(22) Filed: Jul. 21, 2004

(65) Prior Publication Data

US 2005/0061312 A1   Mar. 24, 2005

(30) Foreign Application Priority Data

Jul. 22, 2003   (CA) ................................. 2,433,925

(51) Int. Cl.
*F24J 2/30* (2006.01)
(52) U.S. Cl. .................................... 126/643
(58) Field of Classification Search ............... 126/599, 126/629, 630, 633, 643, 450
See application file for complete search history.

(56) References Cited

U.S. PATENT DOCUMENTS

| | | | |
|---|---|---|---|
| 4,054,125 A * | 10/1977 | Eckels ......................... | 126/633 |
| 4,197,993 A | 4/1980 | Trombe et al. | |
| 4,237,865 A | 12/1980 | Lorenz | |
| 4,273,100 A * | 6/1981 | Cogliano ..................... | 126/635 |
| 4,323,053 A | 4/1982 | McCullough et al. | |
| 4,424,804 A | 1/1984 | Lee | |
| 4,442,827 A * | 4/1984 | Helman et al. ............. | 126/617 |
| 4,471,758 A * | 9/1984 | Jennings ..................... | 126/591 |
| 4,485,804 A | 12/1984 | Sharpe | |
| 4,587,376 A | 5/1986 | Kosaka et al. | |
| 4,596,237 A | 6/1986 | Melchior et al. | |
| 5,596,981 A * | 1/1997 | Soucy ......................... | 126/704 |
| 6,532,952 B1 * | 3/2003 | Kreamer ..................... | 126/628 |

FOREIGN PATENT DOCUMENTS

| | | |
|---|---|---|
| CH | 632 832 | 10/1982 |
| WO | WO 95/10740 | 4/1995 |
| WO | WO 99/10934 | 3/1999 |

OTHER PUBLICATIONS

International Energy Agency, Photovoltaics/Thermal Solar Energy Systems, Task 7, Report IEA PVPS T7-10, as early as 2002.
European Solar Thermal Industry Federation, 'Appendix 1—Applications and Technology' of Sun in Action II—A Solar Thermal Strategy for Europe, P68-76, Apr. 2003.
Conserval Engineering Inc., Conserval Solarwall brochures and website http://www.solarwall.com/sw/solarwall.html, as early as 2002, Internet on-line.

* cited by examiner

*Primary Examiner*—S. Gravini
(74) *Attorney, Agent, or Firm*—Christensen O'Connor Johnson Kindness PLLC

(57) ABSTRACT

A wall integrated thermal solar collector with heat storage capacity includes a transparent layer and a solar radiation absorption layer, that is separated by an air gap from the transparent layer. A heat storage layer of phase changing material is positioned in close contact with the solar radiation absorption layer to facilitate heat transfer. A structural panel of thermally insulating material is positioned adjacent to the heat storage layer.

11 Claims, 8 Drawing Sheets

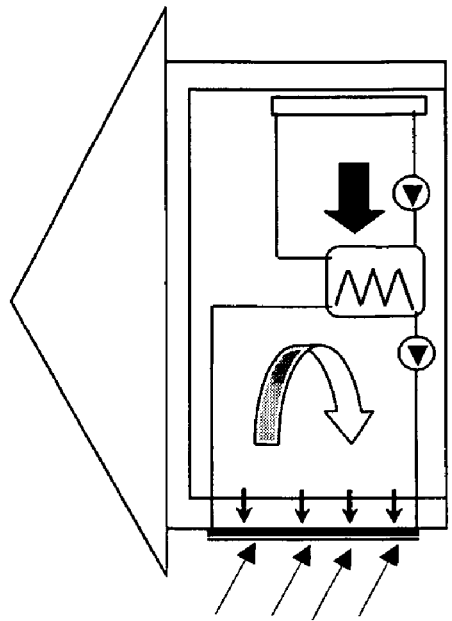
FIG 10.- PRIOR ART
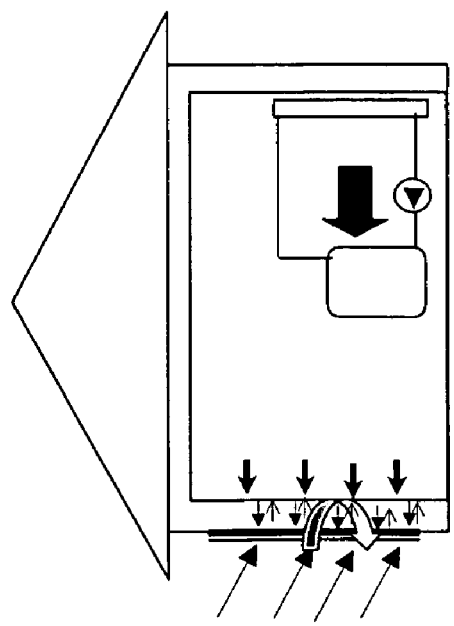
FIG 11 - PRIOR ART
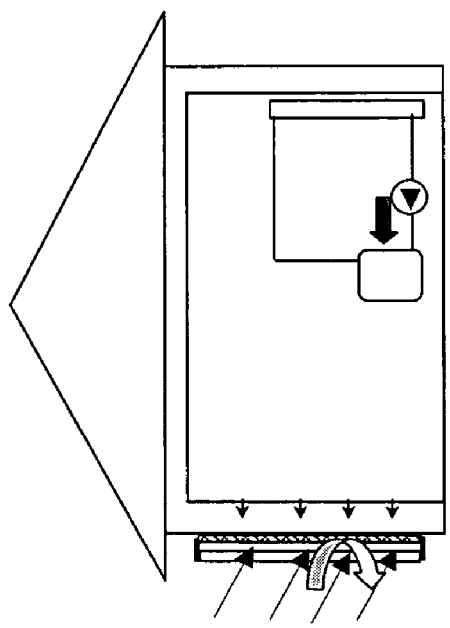
FIG 12

WALL INTEGRATED THERMAL SOLAR COLLECTOR WITH HEAT STORAGE CAPACITY

FIELD OF THE INVENTION

The present invention relates to a thermal solar energy collector that is combined with a building wall and capable of heat storage.

BACKGROUND OF THE INVENTION

In cold climate regions like Canada, a predominant amount of energy expended in residential housing (65%) is spent for space heating. Efforts have been made to get a portion of this space heating energy from solar radiation. Various solutions have already been proposed in the prior art to use solar energy for house heating. Typically heat can be generated from solar radiation in different types of thermal solar collectors and systems like; vacuum tube collectors, flat plate collectors, Trombe wall or solar wall. The most efficient, in terms of heat generation, are vacuum tube collectors and flat plate collectors. These collectors are usually used for hot water generation, as they are too expensive to be used for space heating. It is known that utilization of solar energy for house space heating involves two basic types of thermal solar systems—active and passive.

Active Systems

A typical active system uses a glazed flat thermal collector. During a heating period (day), solar radiation is converted into heat and the generated heat is transferred with circulated liquid to a central heat storage tank (e.g. water tank). During a demand time (night), the accumulated heat is redistributed by a heating system which circulates heated fluids. Such solutions require a system that consists of the solar collectors, a network of pipes, a heat storage tank, a fluid circulating pump, control valves and controllers inside a building. The systems are complex, and involve costly installation of the network of pipes with fluid circulating pump. The systems are prone to freezing when exposed to freezing temperatures, unless expensive liquids are used. In some active systems, heat can be transferred with forced circulating air systems (as described in U.S. Pat. No. 4,197,993), but because of the low heat capacity of air, such systems are limited for ventilating purposes.

The active system has a certain number of drawbacks. They are:
  relatively complex and feature a costly system of pipes, heat storage, heat control and heat redistribution systems
  need for pumps and energy required for pumping
  operational problems with leakage and/or plugging (maintenance).

Passive Systems

Passive systems are simpler and cheaper and, therefore, becoming more and more popular. However, they have lower efficiency. In a typical passive system, solar energy is collected by a thermal energy collector combined with a wall and transferred by conduction to the house wall for storage. In such systems, a solar radiation absorption layer often is combined with a glazed enclosure and a heat trap to reduce heat losses and improve efficiency. The simplest and best known solution of this kind of system is the Trombe wall. The Trombe wall solution consists of a transparent cover and an absorption layer deposited on a heat transmitting and accumulating material like concrete, bricks or other masonry type of walls. Heat generated during exposure to solar radiation is stored in the wall and transferred through the wall to the building interior. A typical Trombe wall consists of a 200 to 400 mm thick masonry wall (or concrete) coated with a dark, solar radiation absorbing material and covered with a single or double layer of glass. The space between the glass enclosure and masonry (collector) is from 20 to 50 mm. The solar radiation passes through the transparent glass and is absorbed by the dark surface of the absorber and slowly transferred inward by conduction through the masonry. It takes about 8 to 10 hours to transfer heat to reach the interior of the building for a 200 mm thick Trombe wall; thus, a Trombe wall absorbs and stores heat for evening/night use.

In passive systems, collected heat is transferred to the wall to material that is characterized by large thermal mass (masonry, bricks, concrete) and is heat conductive. The masonry type of wall required for heat storage (as the thermal mass) is typically a poor thermal insulator. During prolonged cold nights, or cold, cloudy days, such walls experience significant heat losses. As a result, the application of such systems in cold regions (e.g. Canada) is not practical.

The prior art features several attempts to improve the ability to collect heat, reduce energy losses and increase performance. One such solution is described in U.S. Pat. No. 4,323,053, where a solar collector is equipped with an integral heat trap in a transparent wall. The solar radiation absorber is arranged to collect incident solar radiation passing through the front enclosure.

In another, similar solution, developed by Energiesysteme Aschauer Ltd. in Linz, Austria, a heat trap in a form of cellulose comb is positioned between the glazing and a heat-storing wall. This solution combines the thermal insulation ability with direct heat storage in the wall. However, this kind of wall still lacks sufficient thermal insulation for cold climate regions. Thick cellulose layer blocks allow efficient heat transfer into a heat accumulating wall that on its own has limited thermal insulating value.

U.S. Pat. No. 4,237,865 (Lorentz) describes a solar heating siding panel which includes double panels of clear glass secured in a housing horizontally spaced outwardly of the building. Inside of the housing is located a heat collector. The collector, in the form of an air gap, is closed on the inside by a heat exchanger of substantially thin foil material and spaced inside the glass panels. A system of temperature controlled hinged dampers at the bottom and at the top of the collector passages release a flow of air to heat a room. This system requires complex thermally controlled dampers and does not have any heat storage capacity.

WO patent 99/10934 has a combined photovoltaic/thermal panel that is provided with one or more flow channels, for the purpose of delivering thermal energy during operation to a fluid flowing therein. The PV and thermal collectors have been joined to form a single assembly with the interposition of a metal-containing plastic material having bonding properties. U.S. Pat. No. 4,587,376 describes another combined photovoltaic/thermal solar collector in which a light-permeable superstrate (PV) and a metallic substrate (thermal) are used. These solutions require a structure, which is relatively complex and costly.

A Canadian company, Conserval Engineering Inc., has developed a "SolarWall" technology that is a building integrated collector in the form of a facade or roof element. The solar energy is collected using perforated absorber plates that are mounted in such a way that cold ambient air is allowed to pass behind the perforated panels in a uniform way. Heat generated from the solar energy is transferred to the air, which is used for heating ventilation air. This solution has no capacity to store heat for evening/night use.

An unglazed porous solar collector is sold under the Trade Mark brand name of "SolarWall™". It absorbs the sun's energy and uses it to heat the air that is pulled through the collector surface and into the air distribution path connected to the mechanical system of the building. With SolarWall, air passes through channels between a wall of a building and a solar radiation absorbing layer; however, due to the lack of glazing, the very low thermal capacity of air and low thermal conductivity, such solutions are not very efficient and usually are used to heat air.

In general, prior art solutions require either complex fluid circulating systems feature applied in combination with well insulating walls or simpler passive solutions with direct wall (masonry) heat storage that have limited insulating value and loose a lot of heat when cold, thus limiting their scope of application.

SUMMARY OF THE INVENTION

What is required is a wall integrated thermal solar collector with heat storage capability.

The present invention provides a wall integrated thermal solar collector with heat storage capacity. It includes a transparent layer and a solar radiation absorption layer that is separated by an air gap from the transparent layer. A heat storage layer of phase changing material is positioned in close contact with the solar radiation absorption layer to facilitate heat transfer. A structural panel of thermally insulating material is positioned adjacent to the heat storage layer.

The basic structure, as described above, is capable of being integrated into structural panels which are thermally insulated for extreme winter conditions encountered in cold weather climates. As will hereafter be further described, by incorporating some additional features, even more beneficial results may be obtained.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 10 labelled as PRIOR ART, is a side elevation view, in section, of a house having a Trombe wall system.

FIG. 11 labelled as PRIOR ART, is a side elevation view, in section, of a house having a wall integrated thermal solar collector utilizing circulating fluids.

FIG. 12 is a side elevation view, in section, of a housing having a wall integrated thermal solar collector in accordance with the teachings of the present invention.

DETAILED DESCRIPTION OF THE PREFERRED EMBODIMENT

The preferred embodiment, a wall integrated thermal solar collector with heat storage will now be described with reference to FIGS. 1 through 12.

Figure 2:
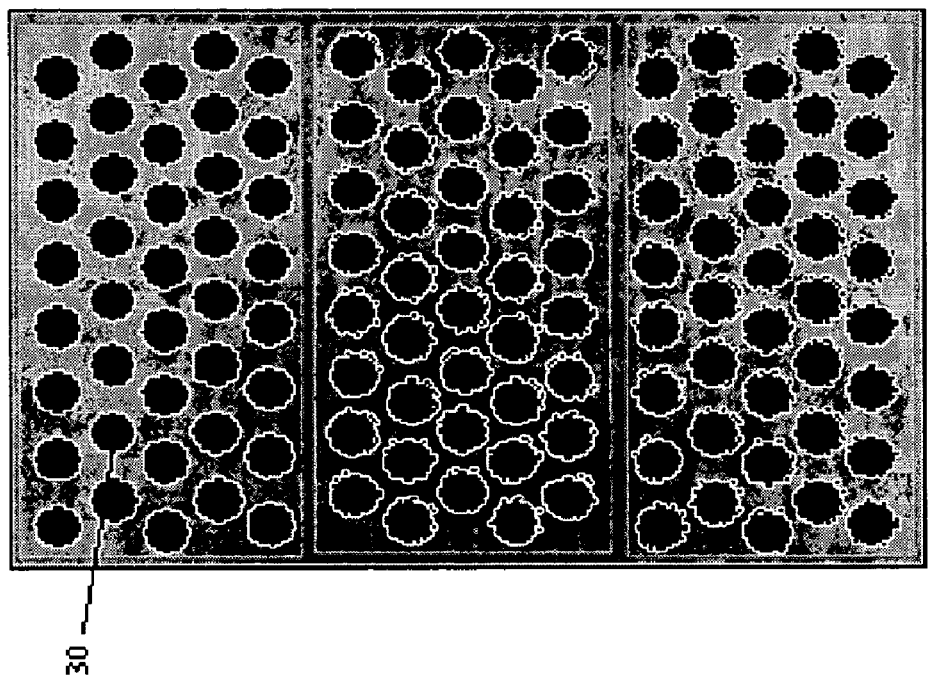
FIG. 2 is a front elevation view of the wall integrated thermal solar collector illustrated in FIG. 1.
Figure 1:
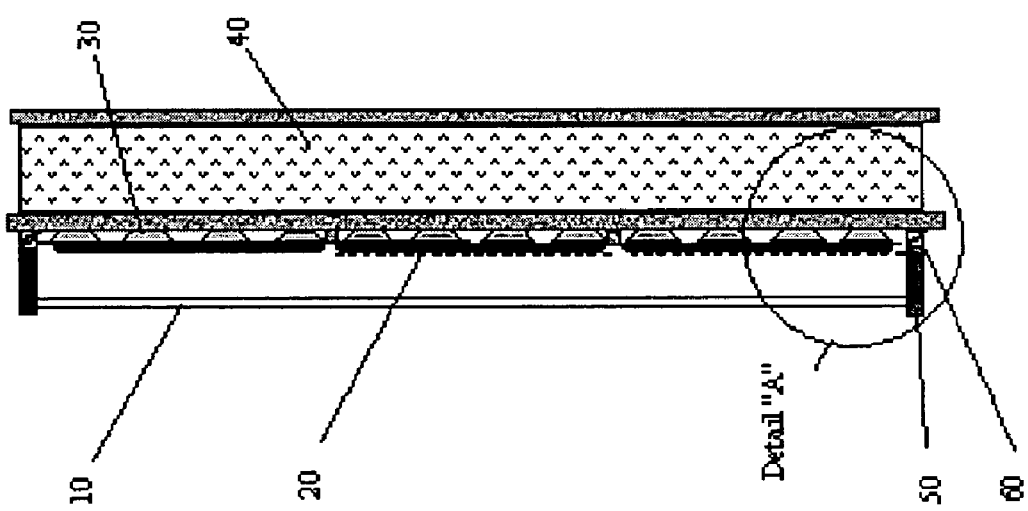
FIG. 1 is a side elevation view, in section, of a first embodiment of wall integrated thermal solar collector constructed in accordance with the teachings of the present invention.
Figure 3:
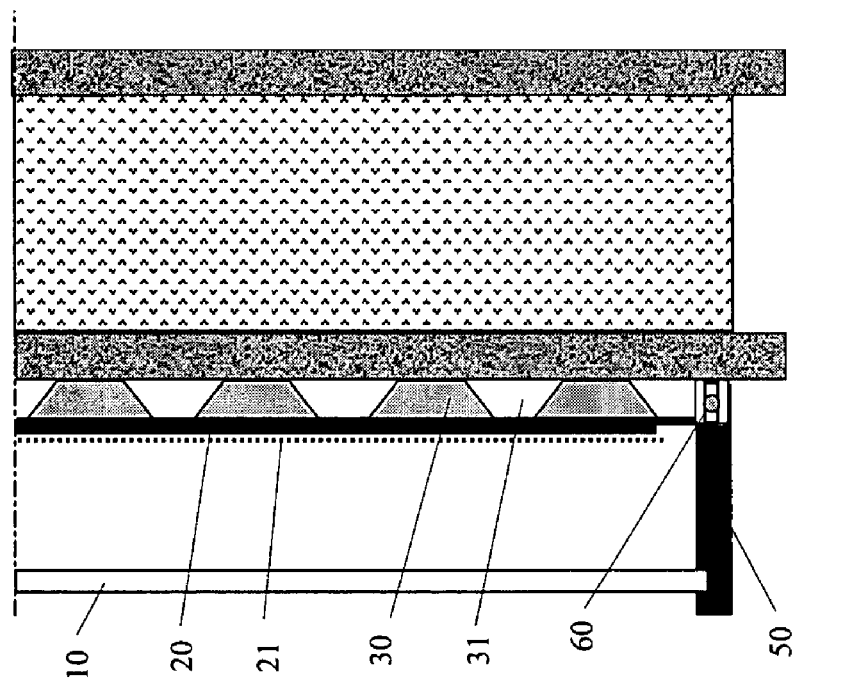
FIG. 3 is a detailed side elevation view, in section, of the wall integrated thermal solar collector illustrated in FIG. 1.

Referring to FIG. 1 through 3 there is shown a schematic, sectional view of a preferred embodiment of the solar thermal wall panel with heat storage that is the simplest solution according to the invention. A panel that is arranged for collecting of solar radiation and for generated heat storage includes several thermal layers and consists of; transparent outer enclosure 10 that is designed to be traversed by the solar radiation, solar absorber plate 20 for collecting solar energy that is separated from transparent outer enclosure by air gap, heat storage layer 30 with capsules of phase changing material and wall 40 that thermally insulates the house and supports the house structure.

The outer enclosure is transparent for sun-light and is made preferably as a double glass or plastic cover to reduce heat losses. The transparent cover is made of material with low solar absorption coefficient and reduced reflection. It can be manufactured like a double, argon filled, low iron glass window.

The next layer, which is absorber plate 20, is a thin metal membrane that is covered with a coating 21 well absorbing solar radiation. The backside of membrane is assumed to be covered with layer 22 that is highly reflective for infrared radiation. The absorber plate is arranged in a distance of about 50 mm from the transparent cover. The backside of the absorber plate is in close contact, with sheet of capsules 30 containing phase changing material to facilitate heat transfer by conduction from heat generating absorber plate to the heat storing material in capsules. The sheet of capsules 30 that represents large thermal mass is mounted on the wall of house or building 40. During sun exposure the phase changing material melts under influence of heat. During nighttime the phase change material crystallizes and releases heat, and continues keeping temperature in the buffer zone steady until all accumulated heat will be used, thus reducing significantly house heat losses. As long as the temperatures on both sides of the wall structural insulating panel are similar there is no flow of heat through the wall.

Heat storage material with a buffer zone is sandwiched between the thermal absorber 20 on one side and wall structural insulating panel 40 on the other. The temperature buffer zone 31 is formed by the multi channeled space of air between capsules and house wall. The temperature in the buffer zone is close to the temperature of the phase change. The building wall 40, which in this case is not used for heat storage (as it was in a Trombe wall case), is constructed from materials that are highly insulating (e.g. from foams).

There are many different phase changing materials available on the market, with phase change temperatures applicable for a range of temperatures. The most preferable will be material changing phase in temperatures between 0 to 50° C. and preferably in the range of 15 to 30° C. A good example of such a material is calcium chloride hexahydrate, with a phase change temperature of about 29° C. (Cp about 200 kJ/kg K (phase change) as compared with brick 0.84 kJ/kg K)

The wall system equipped with a buffer zone keeps the internal temperature of the building very stable. The solution as described has the advantage of more efficient solar energy collection and utilization during winter and prevents overheating in summer.

The heat transfer through the wall panel (forming house or building wall), depends mainly on the temperature difference between both sides of the wall panel. By implementing the heat storage/buffer zone, the temperature on the outer side of house wall is only slightly different from the temperature inside of the house (~22° C.) and, as long as there is enough supply of stored heat, the heat transfer through the wall of the house is completely blocked. As a result, a thermal barrier supported by heat from the heat storage system prevents heat losses for many hours after the sun has set. Houses equipped with solar wall modules greatly reduce energy demand from conventional heating system.

Figure 4:
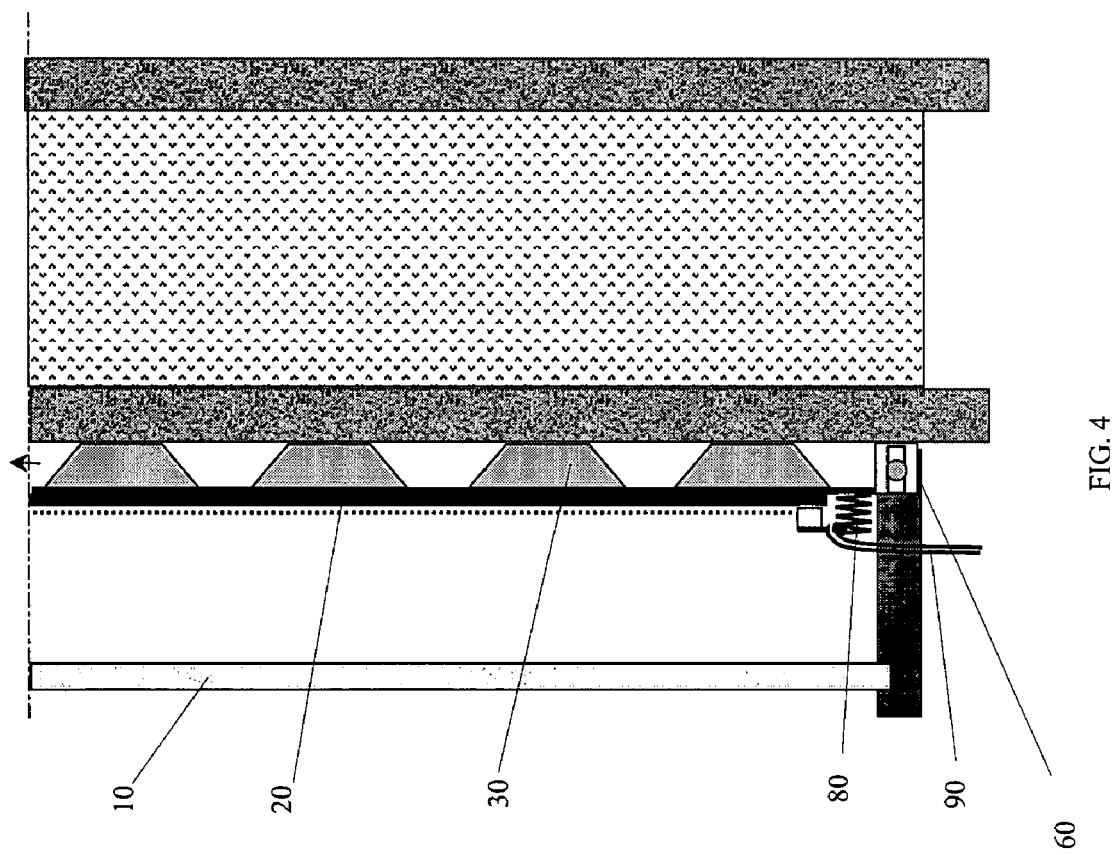
FIG. 4 is a side elevation view, in section, of a second embodiment of wall integrated thermal solar collector constructed in accordance with the teachings of the present invention, with pneumatically controlled absorber membrane in an active winter mode.
Figure 5:
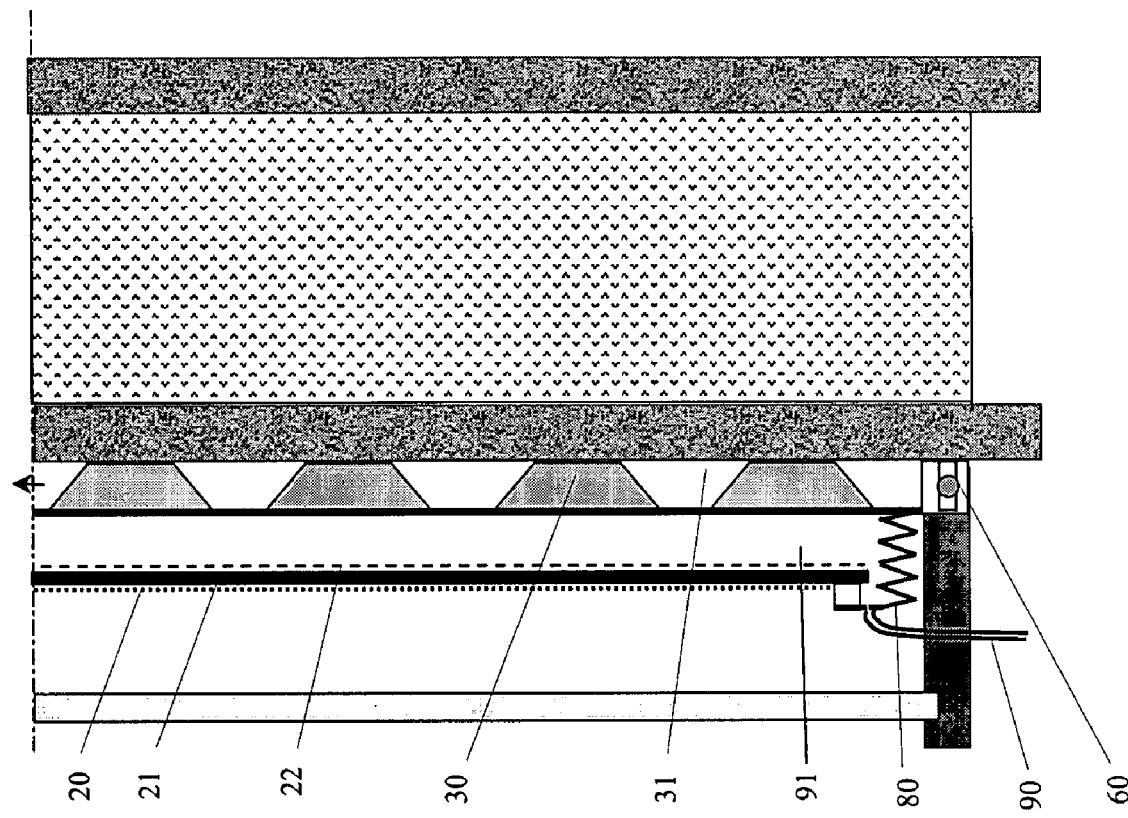
FIG. 5 is a side elevation view, in section, of the wall integrated thermal solar collector illustrated in FIG. 4, with pneumatically controlled absorber membrane in a passive winter mode.

FIGS. 4 and 5 show a sectional view of a thermal panel that according to the invention provides a heat trap for stored heat. The panel is equipped with a pneumatically controlled absorber membrane 20 that is sealed along the perimeter with expanding seal 80. During sun operation the absorber membrane 20, as a result of slight under pressure in pneumatic line 90, is in close contact with heat storage capsules (FIG. 4) facilitating heat transfer from solar radiation absorption plate/membrane to the matrix of capsules. In periods when radiation intensity is not sufficient, or during the night, the pressure in pneumatic line 90 is increased and absorber membrane is taken away from heat storage capsules (see FIG. 5), forming an additional air gap (heat trap) 91 between absorber and heat storage capsules. As a result heat stored in the phase changing material lasts longer yielding a steady buffer temperature for a longer period of time.

Figure 6:
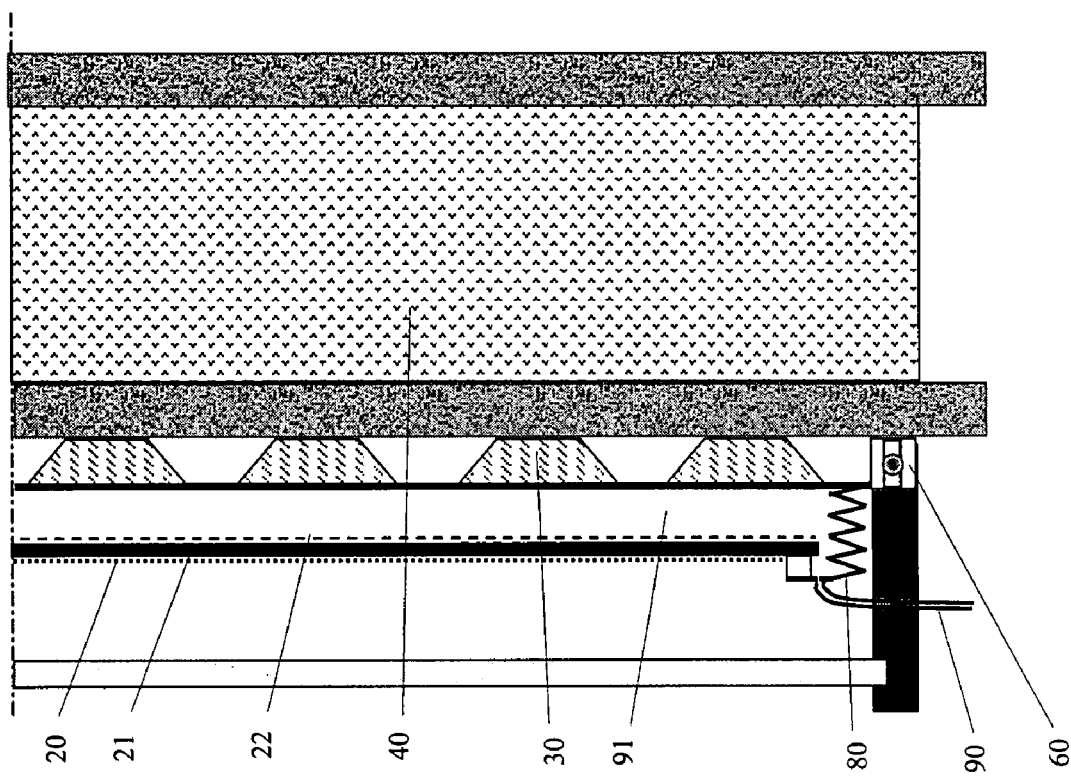
FIG. 6 is a side elevation view, in section, of the wall integrated thermal solar collector illustrated in FIG. 4, with pneumatically controlled absorber membrane in an active summer mode.
Figure 7:
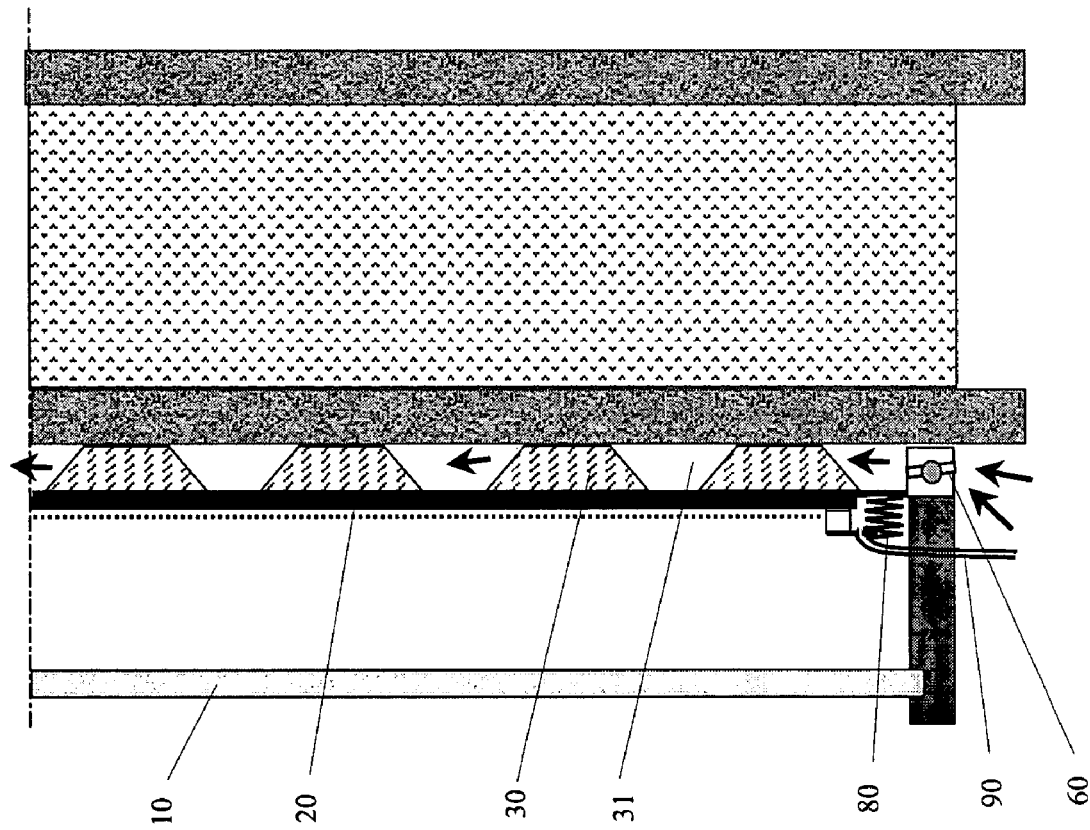
FIG. 7 is a side elevation view, in section, of the wall integrated thermal solar collector illustrated in FIG. 4, with pneumatically controlled absorber membrane in a passive summer mode.

FIGS. 6 and 7 show an application of the thermal panel according to the invention, for preventing the building form overheating in summer. Referring to FIG. 6, during day time, to reduce the heat flow into building, the absorber membrane 20 is separated from the layer of heat storing capsules 30 by air gap 91. The still transferred (but reduced) stream of heat that penetrates the gap is stored in a heat storage system (heat sink) preventing the house wall from getting hot. Referring to FIG. 7, in night time ventilating slots 60 are open and convection induced airflow removes the stored heat to atmosphere. The effect of overheating might only be noticed when the storage capacity of the heat storage system will be exhausted.

Figure 9:
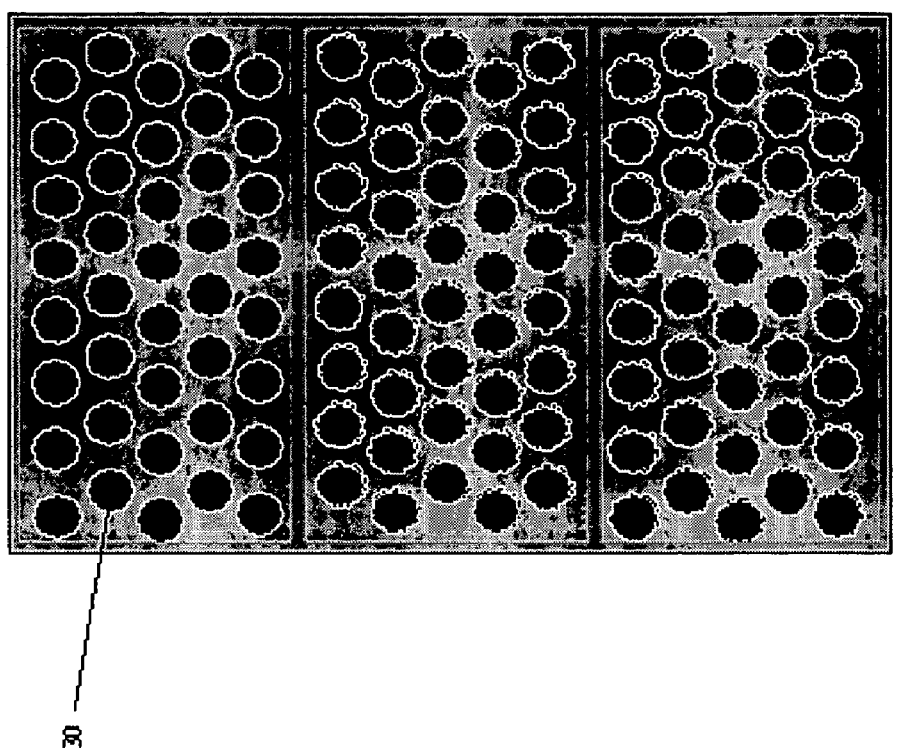
FIG. 9 is a front elevation view of the wall integrated thermal solar collector illustrated in FIG. 8.
Figure 8:
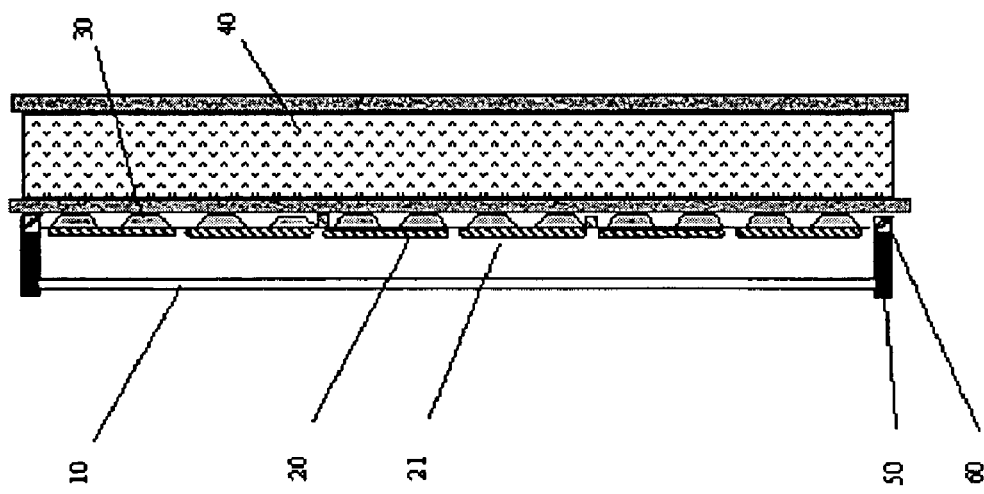
FIG. 8 is a side elevation view, in section, of a third embodiment of wall integrated thermal solar collector constructed in accordance with the teachings of the present invention.

FIGS. 8 and 9 presents an option when photovoltaic cells 20A are used instead of the absorber plate 20. The advantage of such solution is that PV module operation temperature can be reduced and stabilized (at about 30–35 C.), thus increasing PV module efficiency that, as it is known, drops with the increase of the operation temperature. In typical conditions PV modules operation temperature can be as high as 50–60 C. The silicon PV module efficiency decreases by about 4% for every 10° C. temperature increase. Another advantage of such a solution is a reduction in absorber cost by the creation of the advanced hybrid PV/thermal type of solar collector with heat storage.

During daytime exposure of the solar collector to the sun, the collected heat is used to melt phase change material thus storing heat (in summer preventing excessive house overheating). As a result, a heat demand for house/building space heating is significantly decreased because the time when heat losses through the wall are possible is remarkably shortened. Implementation of the steady temperature buffer zone also significantly reduces impact of the outside temperature fluctuations. As a result the house interior temperature stabilizes. In effect a house/building using "advanced skin technology" will hardly experience any overheating during day and will keep warm for many hours after sunset until stored heat is exhausted. The capsule arrangement creates a network of channels that can be utilized as air channels for the purpose of an air ventilating system or for heat removal during summer nights.

Referring to FIG. 10 through 12, there is shown a comparison of various heating models. FIG. 10 shows operation of the Trombe wall system. FIG. 11 shows the operation of a solar thermal space heating system with a circulating fluid and internal hot water storage tank for heat storage. FIG. 12 shows a wall integrated thermal solar collector with heat storage capacity in accordance with the teachings of the present invention.

The solar heating panel according to the present invention provides a novel "temperature buffer zone" concept of solar thermal collector. The solar collector is integrated with building/house wall, has ability for extensive heat storage (by implementation a big thermal mass) and has highly efficient thermal insulation. More particularly, the thermal solar panel, when integrated with a building wall, forms a warm buffer zone outside a highly efficient thermal insulating wall, and as a result the solution is exceptionally suitable for application in buildings located in cold region areas.

The offered solution is simple. Its implementation is limited to the outer shell of the house (suitable for retrofitting), is cost effective and overcomes the enumerated problems of either flat panels or passive wall systems. The proposed solar thermal collector is easy to install, is durable and very economical to manufacture.

The heat storing layer according to the present invention, comprise a phase changing material that is in direct contact with the plate absorbing solar radiation and accumulates heat directly in the absorption layer beneath. The heat accumulation occurs in a phase changing material that changes phase preferably at the temperature of about 10 to 30° C.

In winter the buffer zone with heat accumulation capability, extends the period of keeping the buffer zone warm far beyond sun exposure time (after sunset), thus reducing significantly heat loses from the building.

The warm buffer zone, with high heat accumulation capacity, blocks heat escape through the building wall not only during solar radiation exposure but also for a long time after sunset.

The wall-integrated thermal collector can be equipped with an apparatus to maximize the heat transfer and gain during collector exposure to sun and to reduce the heat losses when the system is inactive, during periods when no sufficient radiation intensity is available (very cloudy sky or during a night).

By forming the long lasting warm buffer zone outside the building shell (with the temperature in the buffer zone similar to the temperature inside the building), heat losses through the house wall and the need for building space heating are significantly reduced.

The solution as described is useful for the winter heating and for summer time cooling of a house. In summer, on hot days, the buffer zone heat accumulation prevents the building from overheating during the day. The accumulated heat is released to ambient atmosphere in night-time by intensive ventilation of the buffer zone via ventilating slots.

The thermal collector as invented also has an option where the thermal collector plate can be replaced by the photovoltaic cell. In such a case the advantage of the invention is that the heat sink in the buffer zone (in the phase changing material) keeps the temperature of the PV cell low, prevents the photovoltaic cells from overheating and thus improves PV cell efficiency. It is well known that the silicone PV cell efficiency drops with temperature growth at rate of about 4% on each 10° C. temperature increase.

The functions of the integrated solar panel according to invention are:

efficient solar energy collection,
heat storage and temperature stabilization and
highly effective thermal insulation The basic invention idea is to collect, store and manage the collected heat inside the envelope of the house shell thus avoiding pipes, holes in the wall and heat management components. Such system is very simple, cheap and easy to manufacture and install. In traditional thermal solar active heating systems the heat is collected in thermal solar collectors and transferred with the circulating liquid to the storage tank to be utilized during nighttime. As an example, Table 1 below shows building wall heating data for the shortest days of the year, taken Dec. 22, and Dec. 23, 2003. The bottom axis shows the time scale, while the vertical axis displays temperature and irradiance data.

TABLE 1

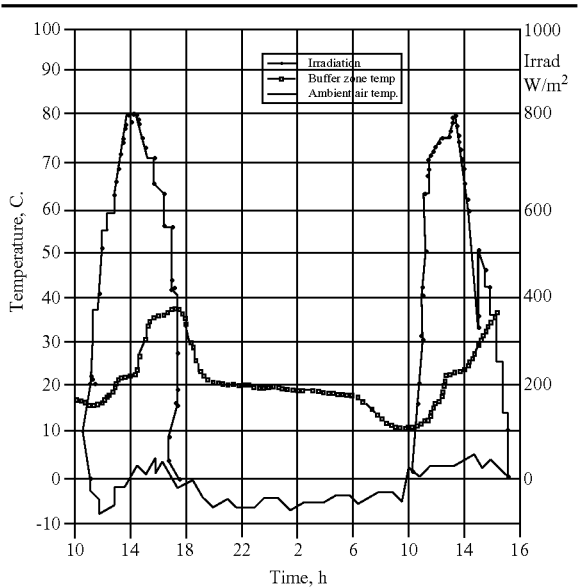

The system as invented that performs the same functions, however do not require any piping, heat storage tanks, heat redistributing system or circulating pump.

It will be apparent from the above description how this invention relates to houses and buildings that utilize solar radiation for the purpose of space heating. It will also be apparent that the system overcomes a number of the drawbacks inherent in other solar space heating systems. It will be apparent that the invention is characterized by very efficient solar energy utilization, simplicity, low costs, applicability for retrofitting and architectural adaptability. It will further be apparent that the invention is particularly advantageous in cold regions. The system uses solar energy as an additional source of heat and provides improved thermal insulation.

It will be understood that the principles of the present invention are applicable to both a flat plate solar thermal and photovoltaic modules with heat recovery, although the heat storage material and temperature buffer zone performs somewhat different functions in each type of solar module.

The invented solar heated insulating wall panel consists of a wall panel and solar thermal collector combined together and comprise:

An outer cover that is made of material transparent for solar radiation,

A collector that absorbs the solar radiation and is separated from the outer transparent cover by air gap A heat storage layer containing phase changing material A structural wall panel that is a house structure element and the main house thermal insulation for the house In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A thermally insulated wall integrated thermal solar collector with heat storage capacity, comprising in combination:

a wall of a building, the wall having an inside surface and an outside surface;

a solar panel mounted to the outside surface of the wall, the solar panel having:

a transparent layer;

a solar radiation absorption layer, that is separated by an air gap from the transparent layer;

a heat storage layer of phase changing material sandwiched between and in close contact with the solar radiation absorption layer to facilitate heat transfer and the outside surface of the wall to facilitate heat transfer;

the heat storage layer of the solar panel collecting heat during the day to shield the outside surface of the wall from heat and thereby maintain the outside surface of the wall at a temperature which is close to a temperature of the inside surface in order to restrict thermal heat transfer through the wall and emitting heat at night to heat the outside surface of the wall and thereby maintain the outside surface of the wall at a temperature which is close to the temperature of the inside surface in order to restrict thermal heat transfer through the wall.

2. The wall integrated thermal solar collector as defined in claim 1, wherein the solar radiation absorption layer is characterized by very low thermal mass.

3. The wall integrated thermal solar collector as defined in claim 2, wherein the solar radiation absorption layer is one of a coated thin solar radiation absorber plate or photovoltaic cell.

4. The wall integrated thermal solar collector as defined in claim 1, wherein means are provided to couple and uncouple the solar radiation absorption layer and the heat storage layer.

5. The wall integrated thermal solar collector as defined in claim 4, wherein the means to couple and uncouple the solar radiation absorption layer and the heat storage layer involves relative movement between the heat storage layer and the solar radiation absorption layer between an absorbing position and a buffer position, in the absorbing position the heat storage layer is in close contact with the solar radiation absorption layer for the purpose of absorbing heat and storing it in the phase changing material, and in the buffer position the heat storage layer is spaced by an insulating air gap from the solar radiation absorption layer, means being provided for relative movement between the absorbing position and the buffer position.

6. The wall integrated thermal solar collector as defined in claim 5, wherein a pneumatic system causes relative movement of the solar radiation absorption layer and the heat storage layer through the application of air pressure.

7. The wall integrated thermal solar collector as defined in claim 6, wherein the pneumatic system is controlled by a temperature sensor, to move between the absorbing position and the buffer position based upon temperature.

8. The wall integrated thermal solar collector as defined in claim 1, wherein the phase change material changes phase in the range of temperatures between −5° C. to +50° C.

9. The wall integrated thermal solar collector as defined in claim 8, wherein the phase change material changes phase in a narrower range between 15° C. to 30 °C.

10. The wall integrated thermal solar collector as defined in claim 1, wherein multiple passages are provided between the heat storage layer and the structural panel thus forming a thermal buffer zone.

11. The wall integrated thermal solar collector as defined in claim 10, wherein thermally controlled ventilating valves are provided to control flow through the thermal buffer zone, such that convection induced air flow can be selectively used to remove excess stored heat to atmosphere.

* * * * *